US011163160B2

(12) United States Patent
Poulad et al.

(10) Patent No.: US 11,163,160 B2
(45) Date of Patent: Nov. 2, 2021

(54) HMD VISOR ASSEMBLY

(71) Applicant: MICROSOFT TECHNOLOGY LICENSING, LLC, Redmond, WA (US)

(72) Inventors: Navid Poulad, San Jose, CA (US); Steven John Robbins, Redmond, WA (US); Srinivasarao Boddapati, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 244 days.

(21) Appl. No.: 16/393,600

(22) Filed: Apr. 24, 2019

(65) Prior Publication Data
US 2020/0271933 A1 Aug. 27, 2020

Related U.S. Application Data

(60) Provisional application No. 62/809,597, filed on Feb. 23, 2019.

(51) Int. Cl.
*G02B 27/01* (2006.01)
*G02B 5/20* (2006.01)

(52) U.S. Cl.
CPC ......... *G02B 27/0172* (2013.01); *G02B 5/208* (2013.01); *G02B 27/0179* (2013.01); *G02B 2027/0174* (2013.01); *G02B 2027/0187* (2013.01)

(58) Field of Classification Search
CPC ............ G02B 27/0172; G02B 27/0176; G02B 2027/0174; G02B 2027/0187; G02B 5/208; G02B 5/281; G02B 5/282
USPC .............................................. 351/13; 359/13
See application file for complete search history.

(56) References Cited

U.S. PATENT DOCUMENTS

| 6,023,372 A * | 2/2000 | Spitzer | G02B 27/017 345/8 |
| 2016/0209655 A1 | 7/2016 | Tazbaz et al. | |
| 2016/0212889 A1 | 7/2016 | Taylor et al. | |
| 2017/0227686 A1 | 8/2017 | Price et al. | |

OTHER PUBLICATIONS

"International Search Report and Written Opinion Issued in PCT Application No. PCT/US2020/017570", dated Jun. 9, 2020, 13 Pages.

* cited by examiner

*Primary Examiner* — Kristina M Deherrera
(74) *Attorney, Agent, or Firm* — Workman Nydegger

(57) ABSTRACT

Head-mounted display visor assembly. A head mounted display visor assembly includes a molded world-facing visor coupled to a separately molded user-facing bathtub. The visor includes an IR opaque and visual light opaque portion coupled to a separately manufactured IR permissive portion. The visor also includes an IR opaque portion. The bathtub includes an IR permissive, but visual light opaque portion and a visual light permissive portion.

20 Claims, 16 Drawing Sheets

HMD VISOR ASSEMBLY

CROSS-REFERENCE TO RELATED APPLICATIONS

This application claims priority to U.S. Provisional Application Ser. No. 62/809,597, filed on Feb. 23, 2019 and entitled "HMD VISOR ASSEMBLY," the entirety of which is incorporated herein by reference.

BACKGROUND

Background and Relevant Art

Computing systems have been implemented which provide virtual reality, augmented reality, and/or mixed reality. In a virtual reality system, a user is placed into a virtual environment where the user can interact with the virtual environment, including interacting with virtual objects in the virtual environment. In an augmented reality system, an actual environment is augmented with virtual objects. That is, the user interacts with the actual environment that the user is present in, but is also presented with virtual objects that the user can interact with.

Augmented reality systems often use a head mounted display (HMD) which allows the user to view the actual environment, but which also includes functionality for displaying virtual objects to the user in the actual environment. This is often accomplished by having sensors in the HMD that are able to sense characteristics of the actual environment, sense user movements, and then based on the sensed characteristics of the actual environment and the sensed user movement, display virtual objects in the actual environment to the user. For example, an augmented reality system may be able to sense a table in an actual environment. The augmented reality system can also detect that a user using an augmented reality system is facing the table. The augmented reality system can cause a virtual object to be displayed to the user on the table. The user can perform various gestures to interact with the virtual object on the table. For example, the user could "pick-up" the virtual object, "move" the virtual object, view different perspectives of the virtual object, etc.

An HMD used with an augmented reality system is, as its name suggests, worn by the user on the user's head. The HMD includes various sensors, projection elements, optical elements (such as lenses), computing hardware, networking hardware, etc. One of the important goals of an HMD is that the HMD feel as natural and unobtrusive as possible. That is, the less noticeable the HMD is to the user, the more natural the HMD will feel. However, various components of the HMD can be quite noticeable to the user. For example, the sheer number of elements of the HMD means that there is some weight and heft to the HMD. To the extent that weight and heft can be minimized, so too can the HMD be made less noticeable. Further, sensors on the HMD may be noticeable to a user. For example, certain infrared (IR) sensors emit a faint red glow that will be visible to the user and will detract from the user experience.

Additionally, optical characteristics of the HMD may cause distractions to the user. For example, as noted previously, the user is able to interact with their actual environment, along with virtual objects in the actual environment. To view the actual environment, the user views the actual environment through various optical elements, such as visually transparent elements. These transparent elements, however, may have characteristics that intrude on the user experience. For example, these elements may become smudged, which obstructs the user's view. In addition, some of these elements may also act as waveguides for visible and/or IR lighting, which can wash out virtual object images being projected to the user, and/or affect IR sensors.

Furthermore, an HMD may need to perform several functions to provide an optimal augmented reality experience, and different regions of the HMD may require different optical properties in order to perform each of these functions (e.g., head tracking, depth tracking, eye tracking, hand tracking, virtual object display, optical transmission of real-world environment). Another important goal is to include all necessary optical regions in the HMD in a cohesive and visually appealing arrangement/configuration.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A head mounted display visor assembly includes a molded world facing visor coupled to a separately molded user-facing bathtub. The visor includes an IR opaque and visual light opaque portion coupled to a separately manufactured IR permissive portion. The visor also includes an IR opaque region. The bathtub includes an IR permissive, but visual light opaque portion and a visual light permissive portion.

A method for manufacturing a head mounted display visor assembly includes obtaining a molded visor composed of a polycarbonate resin and an infrared absorption dye. The molded visor includes a window frame for receiving a separately manufactured IR window. The method includes applying a visible light opaque evaporative coating to a top portion of the molded visor to form an IR opaque and visible light opaque region (which is separate from an IR opaque region of the molded visor). The method also includes obtaining a separately molded bathtub composed of a polycarbonate resin which transmits both IR and visible light, and applying a visible light opaque but IR permissive coating to a top portion of the separately molded bathtub to form an IR permissive, but visible light opaque region (which is separate from a visible light permissive region of the separately molded bathtub).

A method for using a head mounted display visor assembly includes obtaining a head mounted display including a head mounted display visor assembly (which includes a molded visor with an IR opaque region and an IR opaque and visible light opaque region and a separately manufactured IR window, and a separately molded bathtub coupled to the molded visor and having an IR permissive, but visible light opaque region and a visible light permissive region) and displaying one or more holograms on a display of the head mounted display situated between the molded visor and the separately molded bathtub of the head mounted display visor assembly, such that display light from the display transmits through the visible light permissive region of the separately molded bathtub to an eye of a user, and wherein the separately molded bathtub operates as at least part of an optical system of the HMD for focusing the one or more holograms at a predefined distance from the head mounted display visor assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are generally directed to an HMD visor assembly having various features that improve user experience with augmented reality systems. In particular, some embodiments of the HMD visor assembly include features that block external IR light from affecting IR sensors and/or visible and/or IR light from affecting hologram images projected by the HMD by including IR blocking materials in a front facing external surface. Some embodiments of the HMD visor assembly include elements to provide anti-reflection (AR) and anti-smear (AS) coating on various external facing surfaces. Some embodiments of the HMD visor assembly include AR coatings on various internal facing surfaces. Some embodiments of the HMD visor assembly include a portion that allows IR light, from IR light emitters, directed at a user's eye for eye tracking while blocking visible light from the sensors. Some embodiments of the HMD visor assembly include a window that allows for IR light to be transmitted through an otherwise IR opaque region of the assembly to allow for a depth sensor to be world-facing for the HMD visor assembly.

Embodiments may implement a visor assembly that allows for different portions of the visor assembly to operate at different wavelengths of light (i.e., different bands of light can travel through and/or be blocked by different portions of the visor assembly), but where the visor assembly appears as a uniform body. For example, certain portions of the visor assembly will be operated in an IR bandwidth only while other portions operate in visible light bandwidth only, while other portions will be operated in visible and IR bandwidths, while other portions will not allow visible or IR light. Yet, the visor assembly appears as a single piece with minimal to no visible seams between parts.

In some embodiments, a unique design and manufacturing method create an HMD visor that has no user-visible mechanical mounting features (when installed to the HMD) and eliminates manufacturing tolerances by design for favorable device aesthetics.

Figure 1:
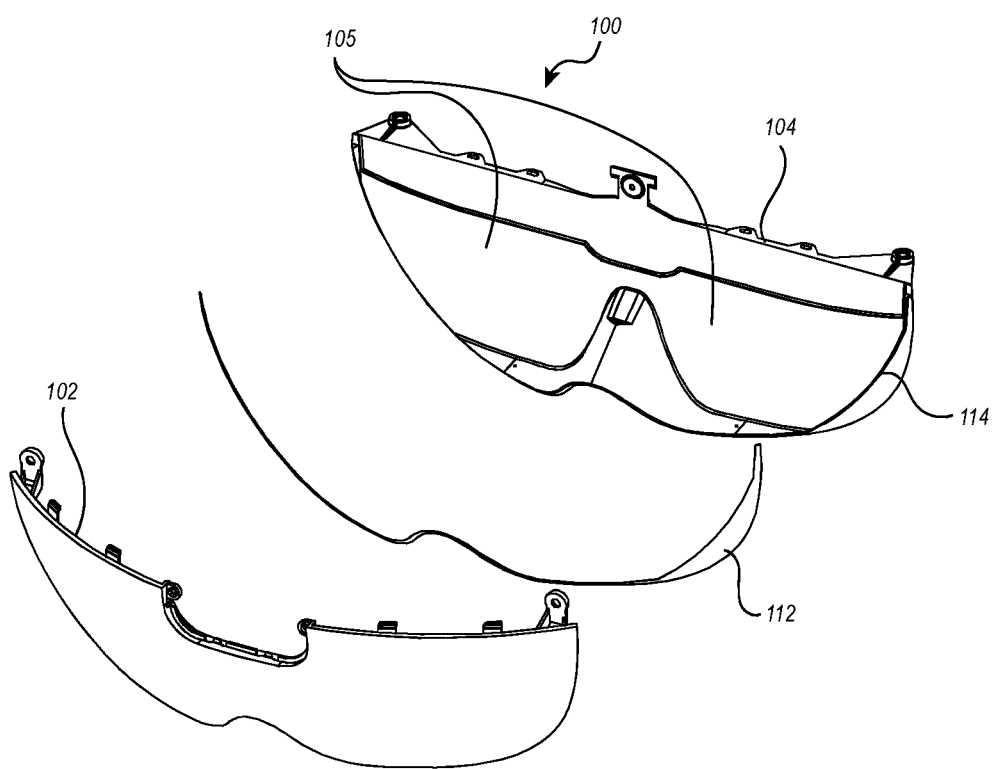
FIG. 1 illustrates an exploded view of a machined visor assembly comprising a visor and a bathtub.
Figure 2:
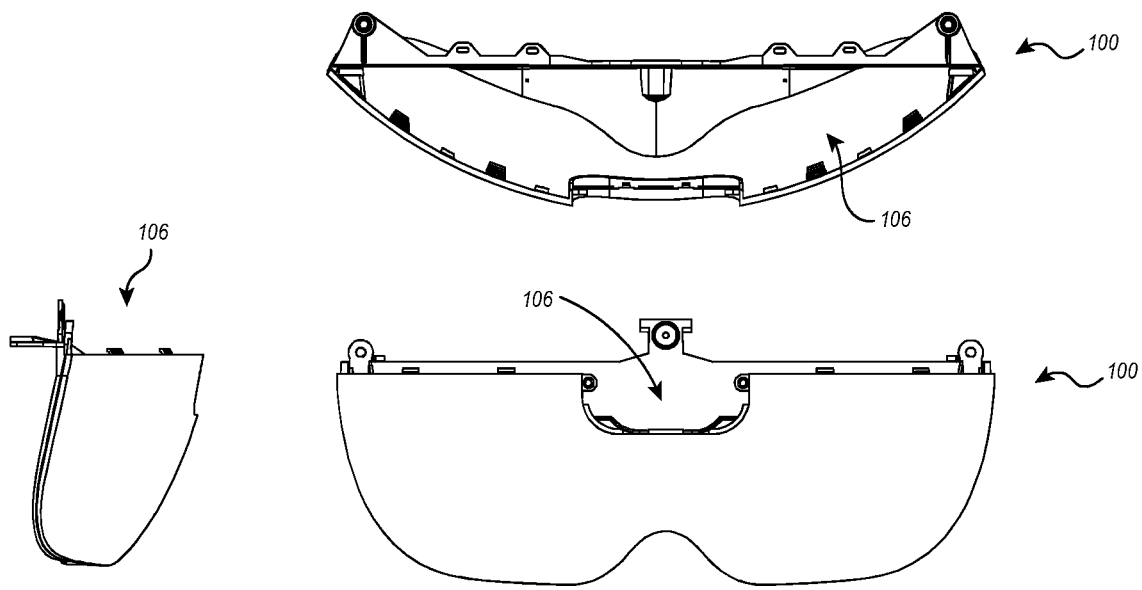
FIG. 2 illustrates top, front, and cross-sectional side views of the machined visor assembly.

The HMD product involves a cosmetic see-through enclosure referred to, and illustrated in FIG. 1, in an exploded view, and in FIG. 2 as the visor assembly 100, which has several features. The visor assembly 100 includes at least two elements: a first visor element (referred to herein as visor 102) and a second visor element (referred to herein as bathtub 104). Those skilled in the art will recognize that the name "bathtub" is colloquial only and in no way limiting, and that bathtub 104 refers to a second visor element of visor assembly 100.

In some embodiments, visor assembly 100 provides a 2-meter lensing element (e.g., included in the bathtub 104 illustrated below) that focuses holograms at a distance of 2 m. In particular, the bathtub 104 may include two plano-concave (spherical) lenses 105 with a focal length of 2 meters. In this regard, a visual light permissive portion of the bathtub 104 is configured to operate as at least part of an optical system (e.g., an optical system including the bathtub 104 and one or more other display elements disposed between the bathtub 104 and the visor 102 in the HMD) for focusing one or more holograms displayed by the HMD at a predefined distance (e.g., 2 meters or another distance) from the HMD visor assembly 100.

In some embodiments, the visor assembly 100 protects the sensitive displays of the HMD from user touch or mechanical contact during shock or drop events by disposing these elements in a cavity 106 (see FIG. 2) existing between a visor 102 and bathtub 104.

In some embodiments, the visor assembly 100 hides a series of retinal glint LEDs used for the purpose of eye tracking by including an IR permissive, but visually opaque portion (i.e., secondary opaque region 120, see FIG. 13A) on the bathtub 104, behind which the LEDs can be disposed.

In some embodiments, the visor assembly 100 creates a seamless continuous visual appearance for the product.

Figure 3:
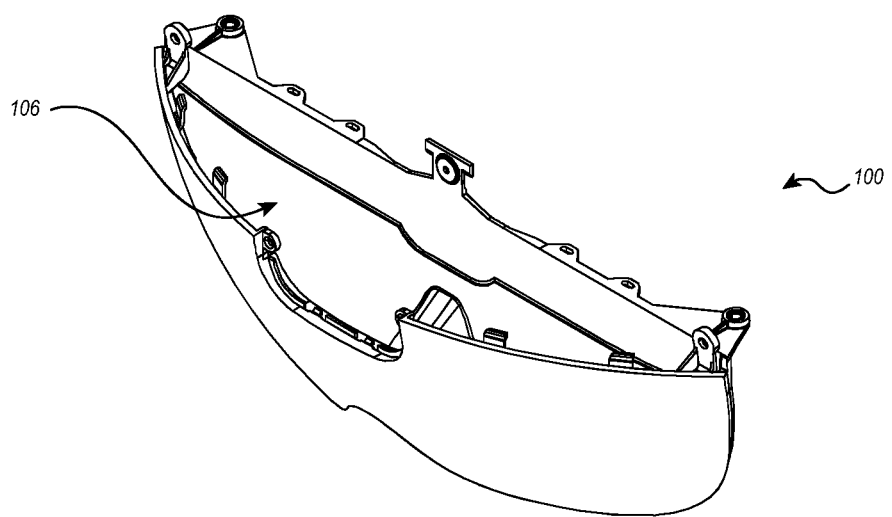
FIG. 3 illustrates an isometric view of the machined visor assembly.

The shape of the finished visor assembly 100 illustrated in FIGS. 2 and 3 would be difficult or impossible to mold, coat, and assemble as a single part (e.g., it would not de-mold, and would have shadows during anti-reflective (AR) and/or anti-smear (AS) coating). The visor assembly therefore, is separately molded initially as two parts referred to as the visor 102 as illustrated in FIGS. 4-8 and the bathtub 104 as illustrated in FIGS. 9-13B, wherein the visor is the world-facing portion of the visor assembly 100 and the bathtub is the user-facing portion of the visor assembly 100. The visor 102 is molded, in some embodiments, from a polycarbonate resin, such as Mitsubishi Lupilon CLS3400 PC. In some instances, the visor 102 is color-matched to have a 46% translucent neutral gray color. The bathtub 104, in some embodiments, is molded from a polycarbonate resin, such as Mitsubishi Lupilon CLS3400 PC, being 95% translucent.

In some instances, utilizing an only partially translucent visor assembly 100 in an HMD causes the real-world environment of a user to appear partially darkened/tinted to the user. In some implementations, this improves the contrast between the hologram(s) displayed to the user on the HMD and the user's real-world environment (e.g., preventing a bright real-world environment from washing out holograms displayed on the HMD). It will be appreciated, however, that the particular use of a 46% translucent gray color with the polycarbonate resin for the visor 102 and a 95% translucent polycarbonate resin for the bathtub 104 is non-limiting, and other resins with other colors and/or translucent characteristics are within the scope of this disclosure.

Furthermore, in some implementations, an IR blocking material (e.g., a near IR absorption dye) is added to the polycarbonate resin for molding visor 102. As described in more detail below, in some embodiments, the IR blocking material helps to prevent stray IR light from interfering with IR sensors of the HMD (e.g., depth tracking sensors, eye tracking sensors). In some instances, the visor 102 formed with the polycarbonate resin and IR absorption dye, transmits visible light (e.g., 450-700 nm) at an average of 48%±2% for 1.2 mm optical pathlength (ignoring reflection losses) and transmits IR light at <20% for wavelengths from 760-930 nm and <15% for wavelengths from 830-900 nm (infrared).

It should be noted that, in some embodiments, the bathtub 104 has no IR blocking dye included in the polycarbonate used for forming the bathtub 104, in particular because IR light must transmit through at least a portion of the bathtub 104 in order to carry out eye tracking functionalities. This will be described in more detail hereinbelow.

In the illustrated example, the two parts (i.e., the visor 102 and the bathtub 104) of the visor assembly 100 have overlapping extensions 108 shown in FIGS. 4, 5, 7-11, and 13A-13B. As will be discussed in further detail, the overlapping extensions 108 are used to mate the visor 102 and the bathtub 104, and a portion of the overlapping extensions 108 will be machined away in later portions of the assembly process (FIGS. 1-3, 6, and 14-15 illustrate the visor assembly 100 or elements thereof after a portion of the overlapping extensions 108 has been machined away). Several things can be accomplished by performing this mating and machining process. For example, in some embodiments, uniform resin flow can be accomplished during molding. In conjunction with this, stress-fringes, which in some instances concentrate around the edges of the mold, can be reduced. This is accomplished, in part, because the stress fringes concentrate on the portion of the overlapping extensions 108 that will be removed after the visor 102 and the bathtub 104 are adhered together. After removal of these portions, visor assembly 100 has a high see-thru optical quality.

Additionally, and/or alternatively, embodiments can provide alignment features for the two "otherwise-un-alignable" parts. For example, the overlapping extensions have matching tabs 110 for matching the visor 102 to the bathtub 104 for assembly. In some embodiments, as shown in FIGS. 4, 5, 7-9, 11, the matching tabs 110 may include holes 111 or other elements for aligning the visor 102 to the bathtub 104 to carry out the manufacturing process. For example, the visor 102 and the bathtub 104 may be removably affixed to one another by securing screws or other fasteners through the holes 111 of the tabs 110. Accordingly, the visor 102 and the bathtub 104 may be secured together to accurately machine away part of the overlapping extensions 108.

Additionally and/or alternatively, embodiments provide an overflow path for adhesive that would be used to bond the two pieces together to form the visor assembly 100. For example, FIG. 1 illustrates an adhesive 112 used to bond the visor 102 to the bathtub 104. In the example illustrated, the adhesive is a UV cured clear adhesive. In some embodiments, the adhesive 112 is DYMAX 3099VT available from Dymax Corporation of Torrington, Conn. It should be noted that the adhesive 112 shown in FIG. 1 represents a portion of adhesive that remains attached to the visor 102 and the bathtub 104 after a portion of the overlapping extensions 108 of the visor 102 and the bathtub 104 has been machined away from the visor assembly 100. In some implementations, a larger quantity of adhesive is applied to bind the visor 102 to the bathtub 104 so as to fill the space between the overlapping extensions 108 (e.g., see overlapping extension 108 of FIG. 11) before the portion of the overlapping extensions 108 is machined away.

Embodiments may include an overflow blocking wall 114 feature on the bathtub 104 such that the dispensed adhesive does not overflow into the user-visible portion of the visor assembly 100. As such, when adhesive 112 is applied to combine the bathtub 104 with the visor 102, the blocking wall 114 directs the overflow of adhesive 112 outward toward the perimeter of the visor assembly 100, thus preventing the adhesive from overflowing into the user-visible portion of the visor assembly.

In some instances, the blocking wall 114 of the bathtub 104 is 0.2 mm high although it will be recognized that other heights may be utilized, such as 0.05 mm, 0.1 mm, 0.15 mm, 0.25 mm, 0.3 mm, or any other value.

Figure 14:
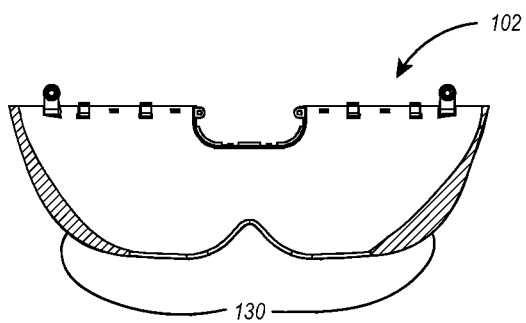
FIG. 14 illustrates a rear view of the visor and illustrates mask areas for the visor.
Figure 15:
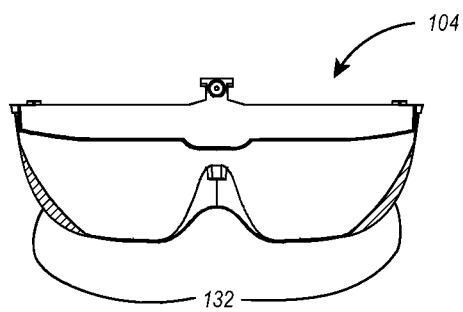
FIG. 15 illustrates a front view of the bathtub and illustrates mask areas for the bathtub.

The two parts of the visor assembly 100 (i.e., the visor 102 and the bathtub 104) are bonded using a clear (visible see-though) UV-curable adhesive 112. Once cured, embodiments CNC-machine away a portion of the overlapping extensions 108 of both parts together in the bonded state so that there is no dimensional mismatch between the two parts once finished (see FIGS. 1-3 for results of machining). Note that as illustrated in FIGS. 14-15, and as will be described in more detail below, embodiments may mask portions of the visor 102 (e.g., region 130 of FIG. 14) and bathtub 104 (e.g., region 132 of FIG. 15) before applying various coatings to prevent the coating materials from being applied to the locations where the adhesive 112 is later applied, as the coating may prevent the adhesive from properly bonding the two parts. In some embodiments, the blocking wall 114 feature can be useful for applying the masking to prevent coatings from being applied.

Figure 8:
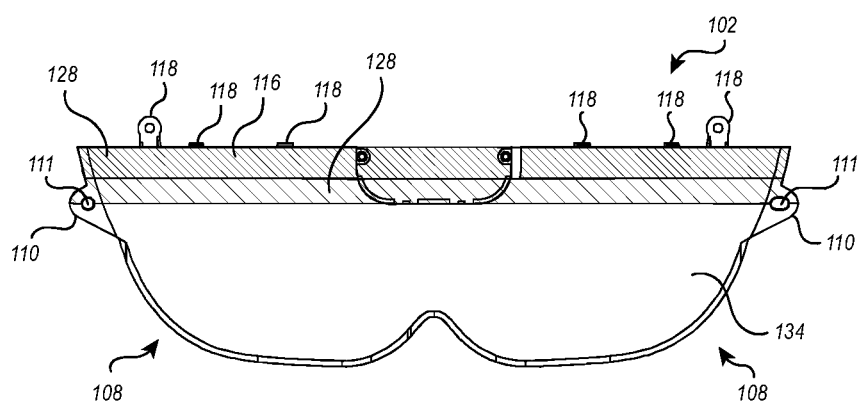
FIG. 8 illustrates a front view of the visor before machining, indicating various optical regions of the visor.
Figure 9:
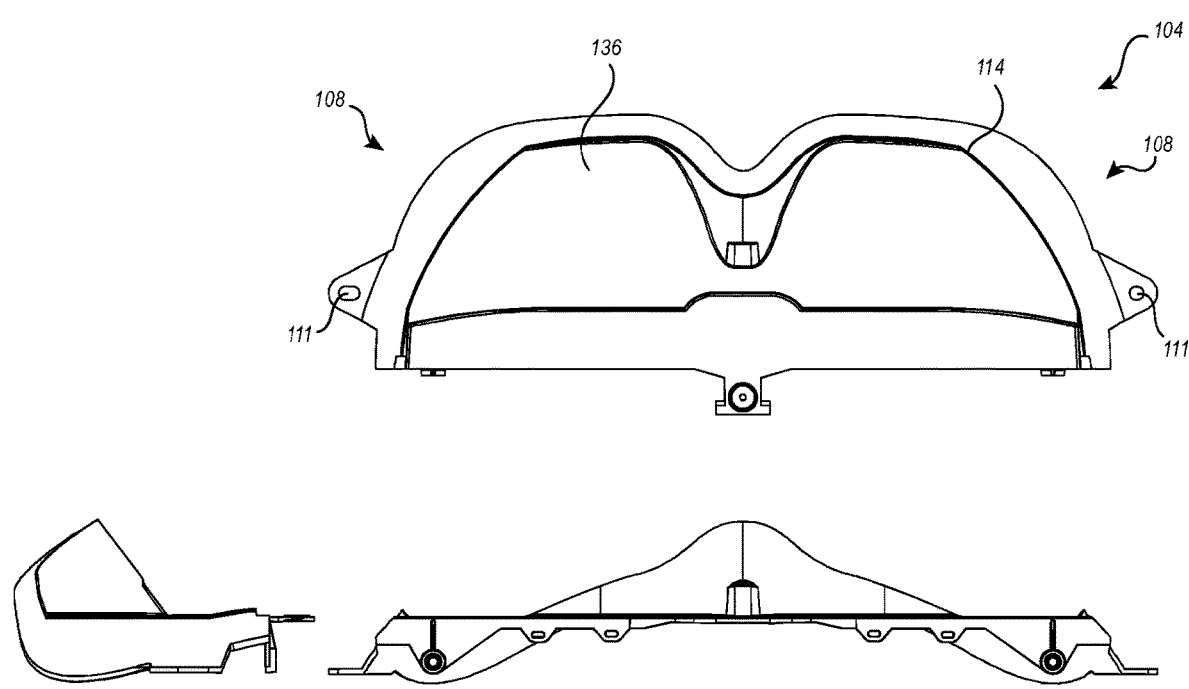
FIG. 9 illustrates top, front, and cross-sectional side views of the bathtub before machining.
Figure 10:
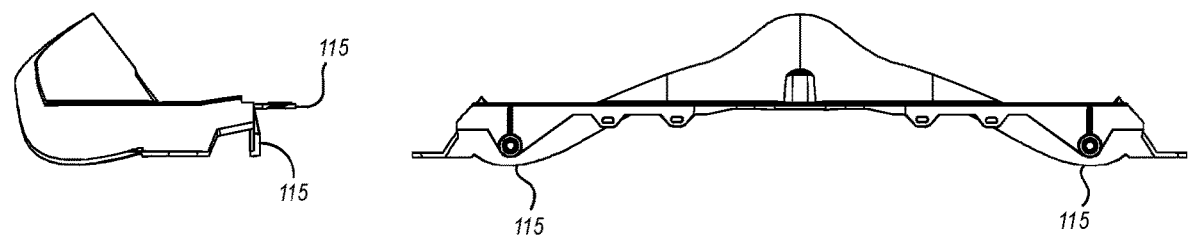
FIG. 10 illustrates top and cross-sectional side views of the bathtub before machining.
Figure 11:
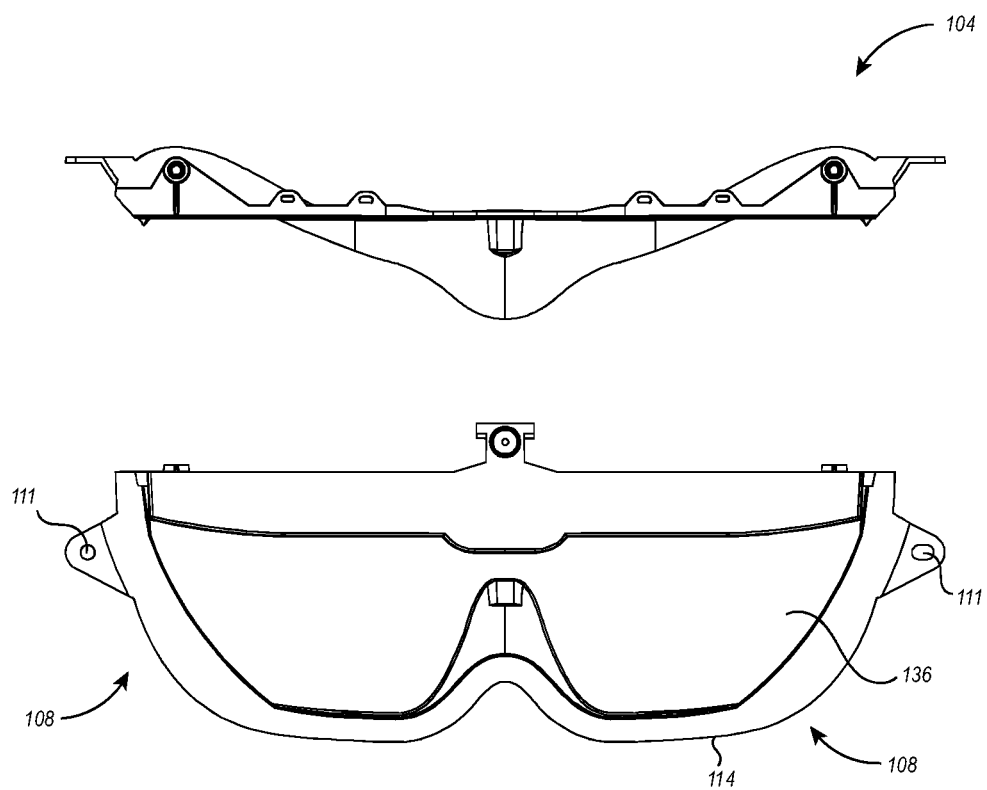
FIG. 11 illustrates top and front views of the bathtub before machining.
Figure 12:
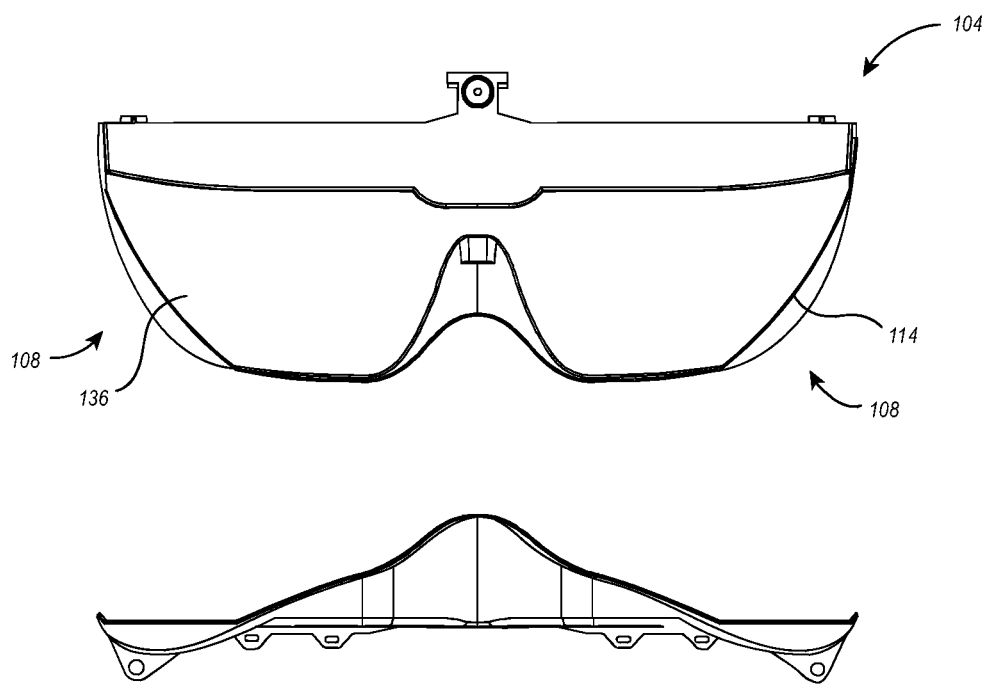
FIG. 12 illustrates front and bottom views of the bathtub after machining.

The mounting features of the visor assembly 100 (e.g., mounting points 118) for mounting the visor assembly 100 to other portions of the HMD are designed such that they are fully hidden inside the product and/or hidden behind a visually (and/or IR) opaque region. For example, in some embodiments, as illustrated in FIG. 8, a cosmetically opaque region 116 may be applied to the visor 102. This cosmetically opaque region 116 is visually and IR opaque. Indeed, the entire visor (except for a depth windows as will be discussed in more detail below) may be IR opaque (forming IR opaque region 134) by adding an IR blocking dye to the material when molding the visor 102. Nonetheless, the cosmetically opaque region 116 formulates an IR opaque and visual light opaque region at the top of the visor 102, which is adjacent to and above the IR opaque region 134 and will hide various mounting points 118 when the visor is installed on an HMD. Other mounting points (such as mounting points 118 shown in FIG. 10) also become obscured as the visor assembly 100 is mounted to a head mounted display.

In some embodiments, the aforementioned cosmetically opaque region 116 on the front (i.e., world facing portion), top portion of the visor 102 is achieved by an evaporative coating on the front portion of the visor 102 of the visor assembly 100 prior to bonding and CNC machining with the bathtub 104 portion. The cosmetically opaque region 116, for example, can be 98% opaque to visible light (not including the base resin transmission characteristics), although other opacities are within the scope of this disclosure (e.g., less than 98% opaque to visible light). As noted above, the cosmetically opaque region 116 shown in FIG. 8 is both visible-light and IR opaque (e.g., IR opaque by virtue of an IR blocking dye added to the resin material for molding the visor 102).

FIG. 8 also illustrates a linear gradient 128 which serves as a gradient between the opaque region 116 and the visual window of the visor 102. The linear gradient 128 is closely controlled to prevent the tinting from getting into the field of view. In some embodiments, the linear gradient 128 is also achieved by an evaporative coating on the front portion of the visor 102, prior to bonding with the bathtub 104. In some instances, the linear gradient 128 varies linearly from 98% to 0% tint, not including base resin transmission. In some embodiments, the linear gradient 128 has a transmission of 5% to 100% (from the opaque region 116 to the visual window of the visor 102, notwithstanding the transmission characteristics of the underlying visor material). Furthermore, in some embodiments, the evaporative coatings constituting the opaque region 116 and the linear gradient 128 are applied to the visor 102 before any antireflective, anti-smear, hard coating (HC), or any other coating to be applied to the visor 102.

As such, the front portion of the visor 102 includes an IR opaque region 134 (which is IR opaque by virtue of an IR blocking dye utilized with the polycarbonate resin during the molding process) and an IR opaque and visual light opaque region.

Figure 13A:
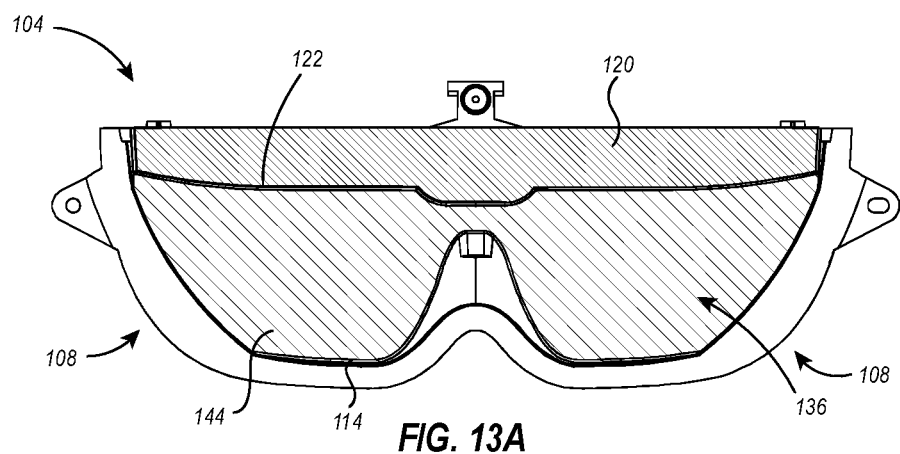
FIG. 13A illustrates a front view of the bathtub before machining.
Figure 13B:
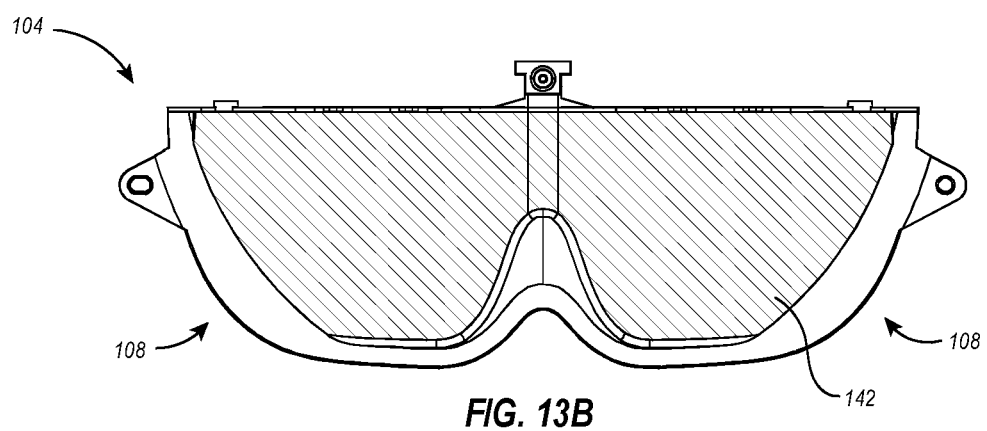
FIG. 13B illustrates a rear view of the bathtub before machining.

In some embodiments, there is a secondary opaque region 120 on the top front (world-facing) portion of the bathtub 104 of the visor assembly 100, as illustrated in FIG. 13A, which illustrates a world-facing side of the bathtub 104. This is achieved, in some embodiments, by spray painting a visual light opaque paint (which is IR permissive or see-through) on the top front portion of the bathtub 104 before bonding and CNC-machining with the visor 102. This secondary opaque region 120 allows IR light from an IR light source (e.g., an IR light emitting diode array) mounted on the top front (world-facing) portion of the bathtub 104 (such that the diode array faces inward toward the spray paint of the secondary opaque region 120 and toward a user) to be directed at a user's eye for eye tracking while blocking visible light from the IR light source. Thus, in some embodiments, the secondary opaque region 120 conceals an IR light source from user view while still permitting IR light from the IR light source to reach the user's eyes for eye tracking.

Note that, in the embodiment shown, the secondary opaque region 120 has a physical down step 122. The secondary opaque region 120 is formed by a mask and spray paint process. The physical down step 122 creates a location to facilitate masking (e.g., the region of the bathtub 104 below down step 122 is masked before spray painting the secondary opaque region 120), as well as an alignment feature for mounting an IR LED based eye-tracking sensor flex assembly within the stepped down feature. In this regard, the physical down step 122 separates the secondary opaque region 120 of the bathtub 104 from the visual light permissive portion 136 (see FIG. 12) of the bathtub 104 (the visual light permissive portion 136 of the bathtub 104 is also IR permissive, in some instances).

Figure 4:
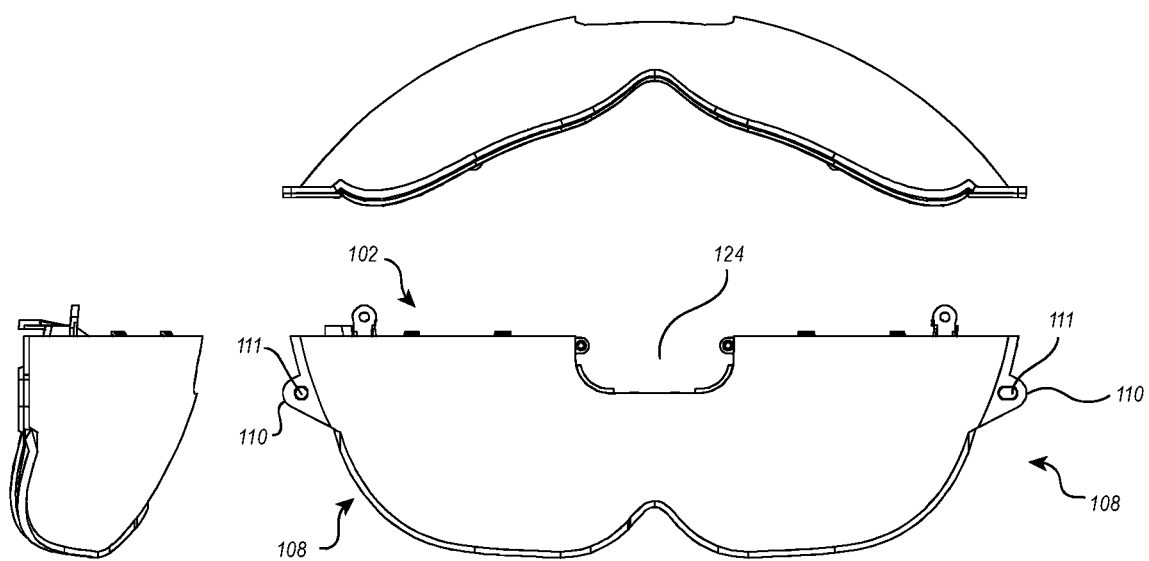
FIG. 4 illustrates rear, bottom, and cross-sectional side views of the visor as molded, before machining.
Figure 5:
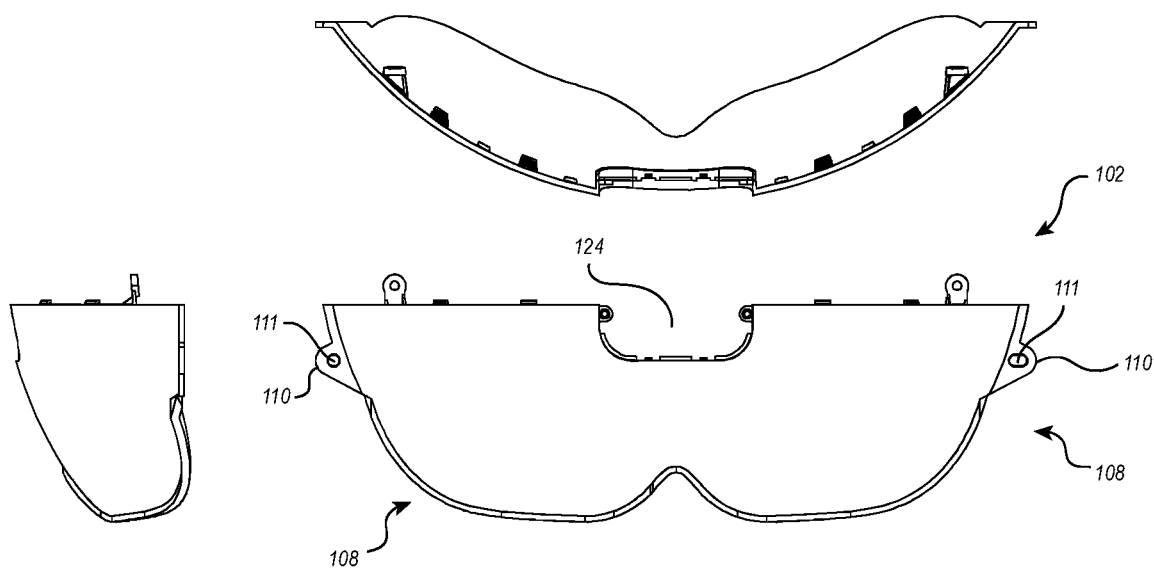
FIG. 5 illustrates front, top, and cross-sectional side views of the visor as molded, before machining.
Figure 6:
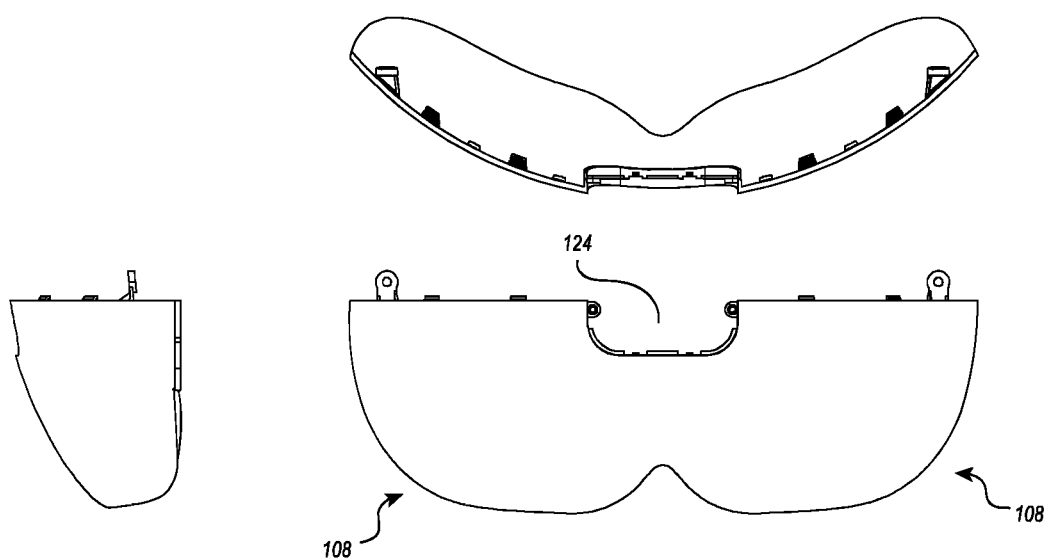
FIG. 6 illustrates front, top, and cross-sectional side views of the visor after machining.
Figure 7:
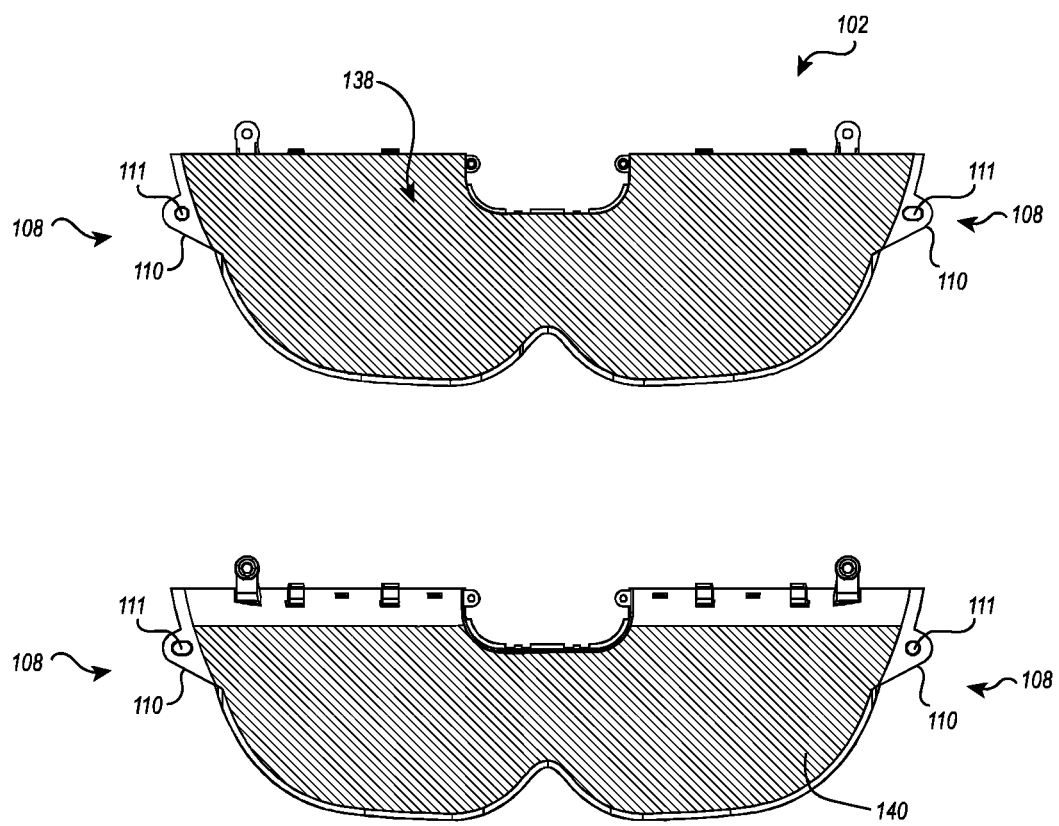
FIG. 7 illustrates front and rear views of the visor before machining.

Referring now to FIGS. 4-6, a window frame 124 in the visor 102 is illustrated. This window frame 124 may have a depth-sensor window, referred to herein as depth window 126 (see FIG. 16), installed in the window frame 124. The depth window 126 allows IR light to pass through, but blocks visible light. In particular, this depth window 126 mounted at window frame 124 provides a location where IR light may be detected in order for a depth sensor (e.g., a depth sensor mounted on the user-facing side of depth window 126) to measure distances between the HMD and objects in the user's real-world environment. As such, the window frame 124 allows for a separately manufactured IR window (i.e., depth window 126) to be coupled to the IR opaque and visual light opaque region (i.e., opaque region 116). In some instances, the depth window 126 allows for the transmission of IR light for depth tracking functionality, whether the IR light is emitted from the HMD or ambient IR reflections off of objects in the user's real-world environment.

The depth window 126 is a separately manufactured part of a different material than the rest of the visor 102. It should be re-iterated that the visor 102 is, in some embodiments, composed of an IR opaque material (e.g., an IR opaque dye is used in molding visor 102), resulting in IR opaque region 134. Because the visor 102 is IR opaque, the visor 102 prevents stray IR light from distorting (e.g., by IR light overloading) the depth measurements of a depth sensor mounted at the depth window or the eye tracking measurements detected by an eye tracking device of the system (or other portions of the system). For example, because the depth window 126 and the visor 102 are separate materials which are combined, and the IR opaque region 134 of visor 102 is IR opaque, internal reflections that might travel through the visor 102 and into the depth window 126 to distort depth measurements are prevented, thus preserving the integrity of the depth measurement systems. Thus, it should also be noted that, while the bathtub 104 passes IR light to allow IR eye tracking, the visor 102 (everywhere except the depth window) is made IR opaque (i.e., the IR opaque region 134) to prevent overloading the IR sensors (e.g., for depth tracking and/or for eye tracking).

In some embodiments, the visor 102 has AR coatings (e.g., a multi-layer dielectric coating) applied to both the external (word facing) and internal (user facing) surfaces to prevent light from internally reflecting within the visor assembly 100. In some embodiments, the bathtub 104 also has AR coatings applied to the external (user facing) and internal (world facing) surfaces to prevent light from internally reflecting within the visor assembly 100. On the visor 102, in one exemplary embodiment, the antireflective performance is reflectance per surface <2.5% average for 0˜40 degree angle of incidence and <3.5% average for 50 degree angle of incidence for wavelengths of 400-700 nm. On the bathtub 104, by way of example, the antireflective performance is reflectance per surface <2.5% average for 0˜40 degree angle of incidence, <3.5% average for 50 degree angle of incidence for wavelengths of 400-700 nm, and <5% average for 0˜50 deg angle of incidence for wavelengths of 820-880 nm (IR).

In some embodiments, the visor assembly 100 may also have AS coatings applied to external surfaces (i.e., the world facing surface of the visor 102 and the user facing surface of the bathtub 104). The AS coatings helps to protect against fingerprints, oils, dirt, dust, and/or other particulates that would contaminate the exterior surfaces of the visor assembly 100 and distort images viewed through the visor assembly 100. Furthermore, in some embodiments, the visor assembly 100 has a hardcoat (HC) applied to the surfaces in order to protect the visor assembly 100 from impacts/disturbances that might potentially damage the system.

In some instances, these coatings are applied prior to assembly and bonding to prevent shadowing that might occur if the visor assembly 100 had these coating applied after assembly (e.g., the coating applied within cavity 106 might have shadowing effects if the coatings were applied after the visor 102 is combined with the bathtub 104). In some embodiments, HC, AR, and AS coatings are applied to the front surface of the visor 102 (region 138 of FIG. 7) after applying the evaporative coatings of the opaque region 116 and the linear gradient 128 (see FIG. 8), and an AR coating is applied to the rear surface of the visor 102 (region 140 of FIG. 7). Additionally, in some embodiments, HC, AR, and AS coatings are applied to the user-facing surface of the bathtub 104 (region 142 of FIG. 13B), and an AR coating is applied to the world-facing surface of the bathtub 104 (region 144 of FIG. 13A). It will be appreciated that the order and combinations of coatings described are non-limiting, and other combinations/orders are within the scope of this disclosure (e.g., an AR, HC, and AS coating could be applied to region 140 of visor 102).

Figure 16:
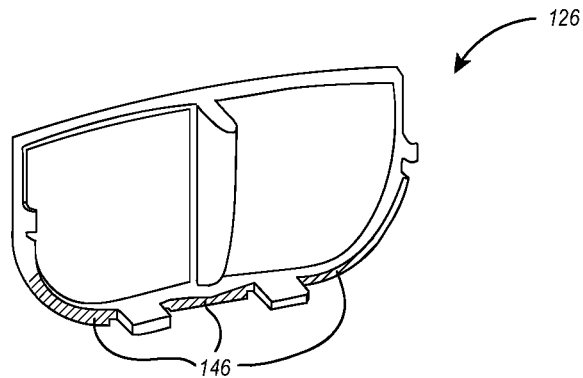
FIG. 16 illustrates a perspective view of a depth window and illustrates mask areas for the depth window.

Furthermore, the depth window 126 may also have coatings applied thereto, such as an HC, AR, and/or AS coating to the front and/or the back thereof. Additionally, a mask may be applied to portions of the depth window 126 (e.g., regions 146 as shown in FIG. 16) before applying such coatings. In some instances, some of the coatings are applied to the depth window 126 after the depth window 126 has been affixed to the visor 102 at the window frame 124, such that the coatings applied to the depth window 126 and the visor 102 are matched to give a continuous visual appearance.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 17:
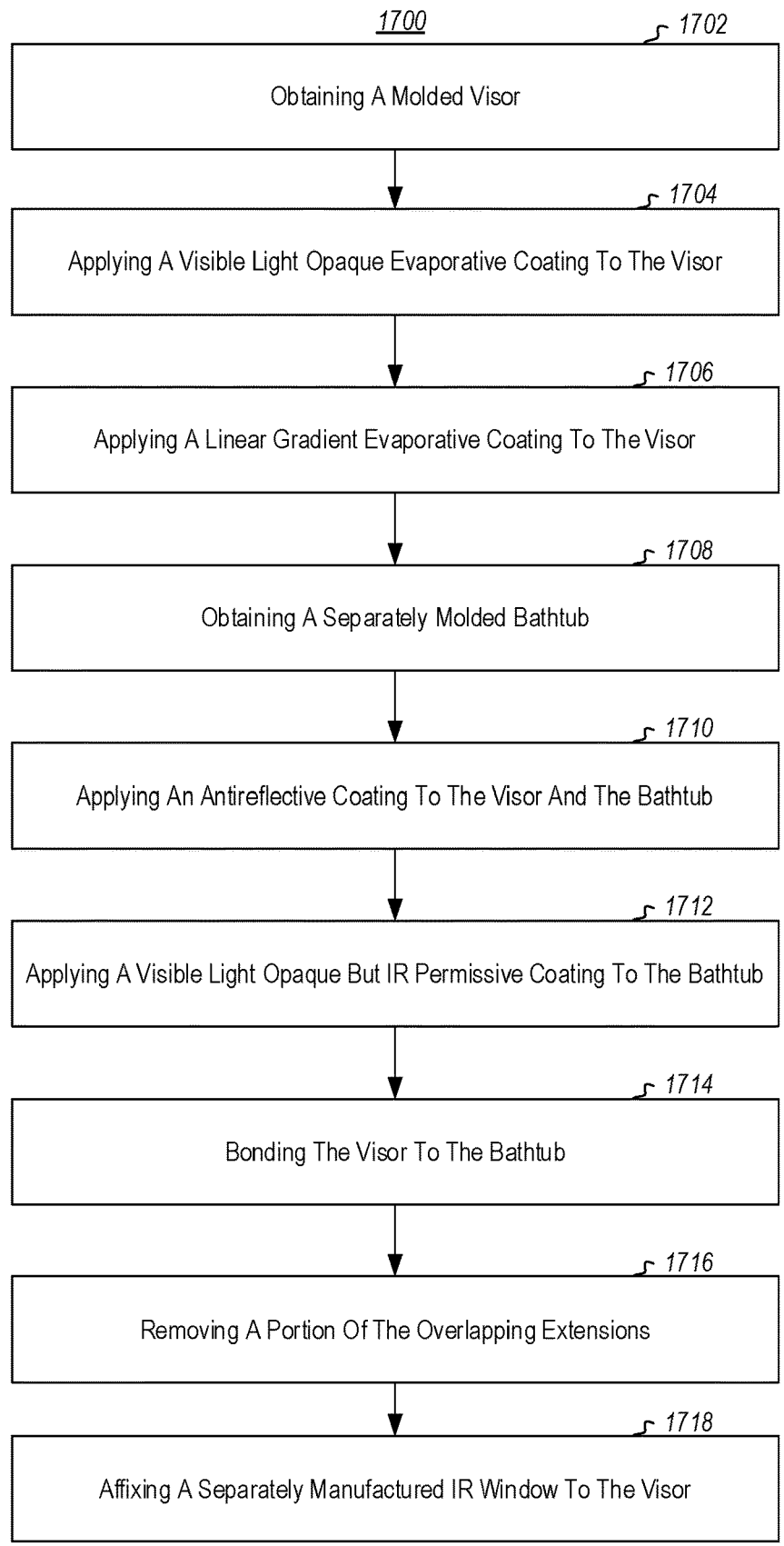
FIG. 17 illustrates an exemplary flow diagram depicting a method for manufacturing a head mounted display visor assembly.

FIG. 17 shows an exemplary flow diagram depicting a method 1700 for manufacturing a head mounted display visor assembly. In particular, method 1700 includes acts of obtaining a molded visor (1702), applying a visible light opaque evaporative coating to the visor (1704), applying a linear gradient evaporative coating to the visor (1706), obtaining a separately molded bathtub (1708), applying an antireflective coating to the visor and the bathtub (1710), applying a visible light opaque but IR permissive coating to the bathtub (1712), bonding the visor to the bathtub (1714), removing a portion of the overlapping extensions (1716), and affixing a separately manufactured IR window to the visor (1718).

As noted above, act 1702 includes obtaining a molded visor. In some embodiments, the molded visor is composed of a polycarbonate resin and an IR absorption dye. Accordingly, the entirety of the molded visor is at least partially opaque to IR light, while being permissive to visible light. In some embodiments, the molded visor is partially tinted (e.g., 46% translucent neutral gray color) to improve the contrast between a user's real-world environment and holograms displayed on an HMD to which the molded visor is subsequently attached.

Furthermore, in some instances, the molded visor includes one or more mounting elements for mounting the molded visor to an HMD. In addition, the molded visor may include one or more overlapping extensions for aligning the molded visor to other elements of a head mounted display visor assembly (e.g., a separately molded bathtub) and for facilitating attachment to the other elements (as described in relation to act 1714). The molded visor may also, in some implementations, include a window frame for receiving a separately manufactured IR window (e.g., an IR permissive, but visible light opaque window, as described in relation to act 1718).

Act 1704 includes applying a visible light opaque evaporative coating to the visor. In some embodiments, the visible light opaque evaporative coating is applied to a top portion of the molded visor on the world-facing side of the molded visor. In some instances, the visible light opaque evaporative coating is applied so as to form, in combination with the underlying IR blocking characteristics of the molded visor (caused by the IR absorption dye utilized in forming the molded visor), an IR opaque and visible light opaque region of the molded visor, which is separate from an IR opaque region of the molded visor (where the evaporative coating was not applied). In some embodiments, the IR opaque and visible light opaque region of the molded visor is 98% opaque to visible light.

Furthermore, act 1706 includes applying a linear gradient evaporative coating to the visor. In some instances, the linear gradient evaporative coating is applied as a transition between the IR opaque and visible light opaque region and the IR opaque region of the molded visor. For example, in some embodiments, the linear gradient serves as a 98% to 0% opaque (as to visible light) gradient between the IR opaque and visible light opaque region and the IR opaque region of the molded visor.

Those skilled in the art will recognize that other coatings (aside from evaporative coatings) may be used, such as dip tint coatings, or other coatings.

Act 1708 includes obtaining a separately molded bathtub. In some embodiments, the separately molded bathtub is composed of a polycarbonate resin without an IR absorption dye, such that the bathtub transmits both IR and visible light.

The separately molded bathtub, in some embodiments, includes one or more mounting elements for mounting the bathtub to an HMD, as well as overlapping extensions for aligning with and facilitating connection to the molded visor. Additionally, in some embodiments, the bathtub includes a physical down step (for separating an IR permissive, but visible light opaque region from a visible light permissive region of the separately molded bathtub, as described in relation to step 1712) and a blocking wall (for preventing adhesive from overflowing onto undesired portions of the bathtub and/or visor).

Act 1710 includes applying an antireflective (AR) coating to the visor and the bathtub. In some embodiments, the antireflective coating prevents reflections between the various optical regions of the molded visor and the separately molded bathtub from distorting or corrupting the functioning of the head mounted display visor assembly (e.g., for depth sensing, eye tracking, display of holograms and/or real-world environments).

In some embodiments, other coatings are also applied to the molded visor and/or separately molded bathtub, such as a hardcoat (HC) or an anti-smear (AS) coating. In one example, HC, AR, and then AS coatings are applied to the front (world-facing) side of the molded visor, and then an AR coating is applied to the back (user-facing) side of the molded visor. Similarly, HC, AR, and then AS coatings are applied to the back (user-facing) side of the separately molded bathtub, and then an AR coating is applied to the front (world-facing) side of the separately molded bathtub.

Furthermore, in some implementations, masks are used when applying the various coatings to the molded visor and/or the separately molded bathtub. In some instances, if an AR coating is applied to portions of the visor or the bathtub where adhesive will be subsequently applied, the AR coating reduces the effectiveness of the adhesive for bonding the visor to the bathtub. Also, AR coatings which are in close proximity (e.g., between the overlapping extensions of the visor and the bathtub) can result in amplified reflections instead of a reduction in reflections. Accordingly, in some embodiments, masks are applied to the overlapping extensions of the visor and the bathtub so that coatings do not interfere with the adhesives that will be applied to the overlapping extensions of the visor and the bathtub. For example, a mask can be applied to region 130 of the back (user-facing) side of the molded visor while the AR and AS coatings are being applied to the molded visor (as shown in FIG. 14), and a mask can be applied to region 132 of the front (world-facing) side of the separately molded bathtub while the HC, AR, and AS coatings are being applied to the separately molded bathtub (as shown in FIG. 15).

Act 1712 includes applying a visible light opaque but IR permissive coating to the bathtub. In some embodiments, the visible light opaque but IR permissive coating is applied to a top portion of the separately molded bathtub and forms an IR permissive, but visible light opaque region of the bathtub, which is separate from a visible light permissive region of the separately molded bathtub (it should be noted that the visible light permissive region of the bathtub is also IR light permissive). In some embodiments, the visible light opaque but IR permissive coating is a visible/visual light opaque paint, and is applied by spray painting. In some instances, the bathtub includes a physical down step, which serves to separate the IR permissive, but visible light opaque region from the visible light permissive region of the bathtub. Furthermore, the physical down step can facilitate a masking guide for masking the visible light permissive region while spray painting the IR permissive, but visible light opaque coating onto the bathtub.

Act 1714 includes bonding the visor to the bathtub. As noted above, in some embodiments, the molded visor and the separately molded bathtub include overlapping extensions for aligning the molded visor with the separately molded bathtub. These overlapping extensions, in some instances, include holes or other alignment features for aligning the molded visor to the separately molded bathtub. Thus, in some embodiments, bonding the molded visor to the separately molded bathtub is accomplished by applying an adhesive to the overlapping extensions of the molded visor and the separately molded bathtub, such that the adhesive couples the molded visor to the separately molded bathtub. In some embodiments, the adhesive is a UV-curable adhesive, such as DYMAX 3099VT.

When applying the adhesive to the overlapping extensions to couple the visor to the bathtub (e.g., when the visor and the bathtub are pressed together after placing the adhesive), it is desirable in some instances to prevent adhesive overflowing onto the optically transmissive portions of the visor and the bathtub (such as the IR opaque region of the visor, and the visible light permissive region of the bathtub). Thus, in some instances, the bathtub includes a blocking wall, which separates the overlapping extensions of the bathtub from the visible light permissive region and the IR permissive, but visible light opaque region of the bathtub. The blocking wall is situated to prevent the adhesive from overflowing onto the visible light permissive region and the IR permissive, but visible light opaque region of the bathtub by physically blocking the adhesive from entering these regions and directing the overflow of the adhesive toward the perimeter of the visor assembly. In some implementations, the blocking wall has a height of 0.2 mm.

Act 1716 includes removing a portion of the overlapping extensions. After bonding the molded visor to the separately molded bathtub, in some embodiments, at least a portion of the overlapping extensions of the visor and the bathtub may be removed (e.g., the alignment features of the overlapping extensions are no longer needed after the parts are bonded together). In some instances, the removal of the portion of the overlapping extensions gives the combined visor and bathtub a near seamless visual appearance, since no over-extending ridge for facilitating attachment is visible. In some embodiments, the portion of the overlapping extensions is removed via CNC machining.

Act 1718 includes affixing a separately manufactured IR window to the visor. In some embodiments, the separately manufactured IR window blocks visible light but transmits IR light, and is affixed to the window frame of the molded visor. The IR window, in some instances, allows the HMD to perform depth detection utilizing IR reflections/scattering off of real-world environmental objects. Because the IR window and the molded visor are separately manufactured, internal reflections between the two that might compromise the integrity of depth measurements are avoided. The IR window can include various coatings applied thereto, such as HC, AR, and AS coatings. The window frame of the molded visor sits, in some embodiments, at the top portion of the molded visor in-line with the IR opaque and visible light opaque region of the molded visor.

Figure 18:
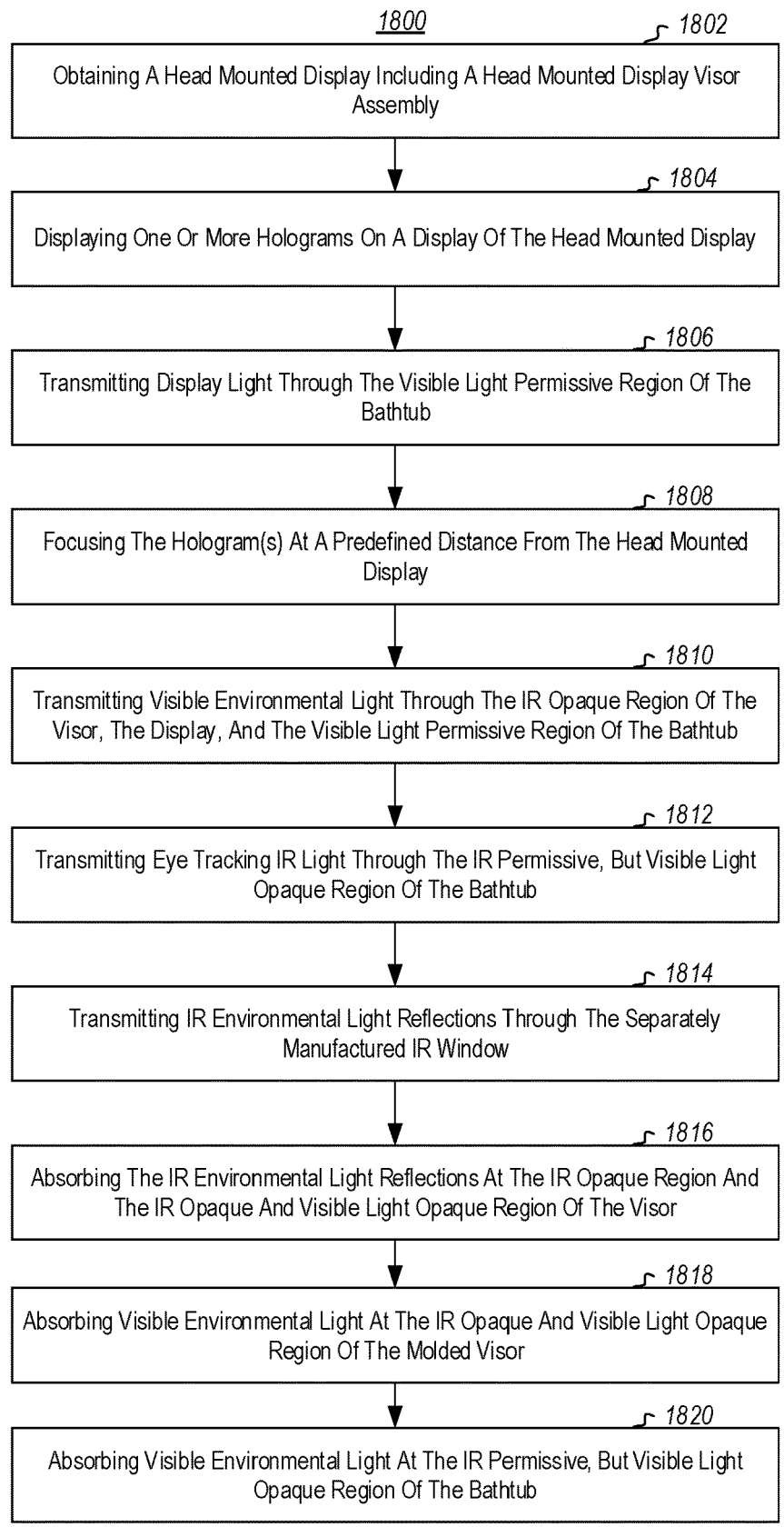
FIG. 18 illustrates an exemplary flow diagram depicting a method for using a head mounted display visor assembly.

FIG. 18 shows an exemplary flow diagram depicting a method 1800 for manufacturing a head mounted display visor assembly. In particular, method 1800 includes acts of obtaining a head mounted display including a head mounted display visor assembly (1802), displaying one or more holograms on a display of the head mounted display (1804), transmitting display light through the visible light permissive region of the bathtub (1806), focusing the hologram(s) at a predefined distance from the head mounted display (1808), transmitting visible environmental light through the IR opaque region of the visor, the display, and the visible light permissive region of the bathtub (1810), transmitting eye tracking IR light through the IR permissive, but visible light opaque region of the bathtub (1812), transmitting IR environmental light reflections through the separately manufactured IR window (1814), absorbing the IR environmental light reflections at the IR opaque region and the IR opaque and visible light opaque region of the visor (1816), absorbing visible environmental light at the IR opaque and visible light opaque region of the molded visor (1818), and absorbing visible environmental light at the IR permissive, but visible light opaque region of the bathtub (1820).

As noted above, act 1802 includes obtaining a head mounted display including a head mounted display visor assembly. In some embodiments, the head mounted display visor assembly corresponds to one manufactured in accordance with method 1700 described hereinabove. In particular, the head mounted display visor assembly includes a molded visor with an IR opaque region and an IR opaque and visible light opaque region at the top of the visor which is adjacent to and above the IR opaque region. The molded visor also has a separately manufactured IR window coupled to the IR opaque and the visible light opaque region. Furthermore, the head mounted display visor assembly includes a separately molded bathtub, which is coupled to the visor and includes an IR permissive, but visible light opaque region at the top of the bathtub, and a visible light permissive region adjacent to the IR permissive, but visible light opaque region.

Act 1804 includes displaying one or more holograms on a display of the head mounted display. In some embodiments, the display is situated between the molded visor and the separately molded bathtub of the head mounted display visor assembly. Thus, act 1806 includes transmitting display light through the visible light permissive region of the bathtub (which is between the user and the aforementioned display) to an eye of the user. Furthermore, act 1808 includes focusing the hologram(s) at a predefined distance from the head mounted display. In some embodiments, the separately molded bathtub includes lenses and operates as at least part of an optical system of the HMD (e.g., including the separately molded bathtub and the display) for focusing the hologram(s) at the predefined distance. In some embodiments, the predefined distance is 2 meters.

Act 1810 includes transmitting visible environmental light through the IR opaque region of the visor, the display, and the visible light permissive region of the bathtub. The environmental light is transmitted toward the eye of the user, such that the environmental light is transmitted to the user's eye simultaneously with the display light being transmitted to the user's eye.

Act 1812 includes transmitting eye tracking IR light through the IR permissive, but visible light opaque region of the bathtub. The HMD, in some embodiments, includes one or more IR light sources (e.g., an array of IR LEDs) situated on the top of the front side (world-facing) of the bathtub, such that the IR permissive, but visible light opaque region of the bathtub is between the one or more IR light sources and the user's eye. Accordingly, when the IR light source emits IR light for eye tracking purposes, the IR light transmits toward the user's eye through the IR permissive, but visible light opaque region of the bathtub.

Act 1814 includes transmitting IR environmental light reflections through the separately manufactured IR window. The IR light that causes the IR light reflections in the user's real-world environment may be emitted from the HMD, another device (such as a dedicated IR light emitter specifically for depth tracking purposes), or natural sources (e.g., the sun). These IR environmental light reflections transmit through the separately manufactured IR window, which is visible light opaque, but IR light permissive. After transmitting through the separately manufactured IR window, the IR light is detected, for example, by one or more IR detection devices for tracking the depth of the objects in the user's real-world environment.

In addition, act 1816 includes absorbing the IR environmental light reflections at the IR opaque region and the IR opaque and visible light opaque region of the visor. The IR environmental light reflections that impinge on the IR opaque region and the IR opaque and visible light opaque region of the molded visor are absorbed by these regions of the visor, in particular because the visor is formed with an IR absorption material. In some instances, this prevents the environmental light from interfering with one or more eye tracking IR sensors and/or depth sensors.

Act 1818 includes absorbing visible environmental light at the IR opaque and visible light opaque region of the molded visor. In some embodiments, this obscures one or more mounting elements of the molded visor or separately molded bathtub from view, thus preserving the seamless visual appearance of the head mounted display visor assembly.

Similarly, act 1820 includes absorbing visible environmental light at the IR permissive, but visible light opaque region of the bathtub. In some embodiments, the IR permissive, but visible light opaque region of the bathtub is situated between the user and one or more IR light emitters (for eye tracking) such that the IR permissive, but visible light opaque region substantially prevents visible light from reaching the IR light emitters. Thus, in some embodiments, this obscures the IR light emitter(s) from view. It should also be noted that, in some embodiments, the IR permissive, but visible light opaque region of the bathtub obscures one or more mounting elements of the bathtub and/or the visor assembly from view. These features can preserve the seamless visual appearance of the head mounted display visor assembly.

Having described many of the general features of the disclosed embodiments, the following description refers to various additional features, design specifications, and/or requirements that may be implemented in a head mounted display visor assembly. Those skilled in the art will appreciate that the following features, design specifications, and/or requirements are illustrative only, and do not limit the scope of the present disclosure.

In some embodiments, the visor 102 has an outer radius of 108.95 mm and an inner radius of 107.517 mm, with a maximum thickness of approximately 1.646 mm and a minimum thickness of approximately 1.2 mm, with a y decenter of 2.321 mm and a wedge of −1.485 degrees. Furthermore, in some embodiments, the bathtub has a plano-concave shape with a radius of curvature of 1374.669 mm, a center thickness of 0.9 mm, and an x decenter of 0 mm and a y decenter of −1.6696 mm.

In some instances, the visor 102 has a scratch-dig surface quality specification of 60-40 for the entire front surface (world-facing surface) and the optical apertures of the back surface (user-facing surface). Furthermore, in some instances, the visor 102 has a root mean square surface roughness of less than 6 nm for all optical apertures on the front surface and the back surface. The visor 102 may have reflective color/appearance −2%<delta x<=2%, −2%<delta y<=3%, D65(x)=0.3128, D65(y)=0.3290 for all areas on the front surface (after the AR coating is applied) and see-through color 2%<delta x<=2%, −2%<delta y<=3%, D65 (x)=0.3128, D65(y)=0.3290 (neutral gray). The visor 102 may have a hardness of HB at 50 g for the entire front surface and a water contact angle of greater than 100 degrees. In some embodiments, the visor has a color rendering index CIE $R_a$=>95, such that the see-through spectrum is smooth and does not contain any discrete blocking spectral lines. Further, the visor 102 may have a transmitted wavefront error (slope) of <0.079 um/mm measured over 1 mm period, corresponding to a <0.25 wave PV at 633 nm for 2 mm aperture, or <0.129 mrad ray angle change, and a transmitted wavefront error (peak to valley) of <3 micrometers for the clear aperture (relative to prescription). In addition, visor 102 has, in some embodiments, a haze of less than 1% and UV blocking characteristics of less than 0.03 W/m² for wavelengths of 320-400 nm. Still furthermore, in some implementations, the visor 102 allows up to 3 bubbles/inclusions up to 10 micrometers in size in the manufacturing process.

In some instances, the bathtub 104 has a scratch-dig surface quality specification of 60-40 for the entire front surface (world-facing surface) and the optical apertures of the back surface (user-facing surface). Furthermore, in some instances, the bathtub has a root mean square surface roughness of less than 6 nm for all optical apertures on the front surface and the back surface. Before the AR coating is applied, the bathtub 104 may have a light transmission of min>85% 0˜50 deg angle of incidence at 850 nm±30 nm, and after the AR coating is applied, the bathtub 104 may have a light transmission of min>90% and avg>94% for 0˜50 deg angle of incidence at wavelengths of 450-700 nm. The bathtub 104 may have a hardness of HB at 50 g for the entire front surface and a water contact angle of greater than 100 degrees. Further, the bathtub 104 may have a transmitted wavefront error (slope) of <0.079 um/mm measured over 1 mm period, corresponding to a <0.25 wave PV at 633 nm for 2 mm aperture, or <0.129 mrad ray angle change, and a transmitted wavefront error (peak to valley) of <3 micrometers for the clear aperture (relative to prescription). In addition, bathtub 104 has, in some embodiments, a haze of less than 1% and UV blocking characteristics of less than 0.03 W/m² for wavelengths of 320-400 nm. Still furthermore, in some implementations, the visor 102 allows up to 3 bubbles/inclusions up to 10 micrometers in size in the manufacturing process.

In some embodiments, the secondary opaque region 120 (i.e., the IR permissive, but visual light opaque portion of the bathtub 104) transmits visible light (e.g., from 400 nm to 700 nm) at less then 10%, and transmits IR light (e.g., 0˜50 deg at 850±30 nm) at greater than 85%, and has 60-40 surface quality.

In some embodiments, the depth window 126 transmits p-polarized IR light (e.g., wavelengths 840-890 nm) at a minimum of 90% at 0 degree angle of incidence, a minimum of 90% at 40 degree angle of incidence, and a minimum of 80% at 70 degree angle of incidence. Furthermore, in some embodiments, the depth window 126 transmits unpolarized IR light (e.g., wavelengths 840-890 nm) at a minimum of 90% at 0 degree angle of incidence, a minimum of 86% at 40 degree angle of incidence, and a minimum of 62% at 70 degree angle of incidence. In some instances, the depth window 126 transmits p-polarized IR light (e.g., wavelengths 840-890 nm) at an average of 92% at 0 degree angle of incidence, an average of 92% at 40 degree angle of incidence, and an average of 85% at 70 degree angle of incidence. In some implementations, the depth window 126 transmits unpolarized IR light (e.g., wavelengths 840-890 nm) at an average of 92% at 0 degree angle of incidence, an average of 88% at 40 degree angle of incidence, and an average of 67% at 70 degree angle of incidence. In addition, the depth window 126 may also include HC, AR, and/or AS coatings on one or both sides thereof. The depth window 126 may have a haze of less than 1%, may have a scratch-dig surface quality of 40-20, a surface roughness of less than 6 nm (RMS) across the entire aperture, a water contact angle of greater than 100 degrees, a hardness of HB at 50 g for the entire front surface, a transmitted wavefront error (peak to valley) 840/4 nm, and may allow up to 3 bubbles/inclusions up to 10 micrometers in size in the manufacturing process. Furthermore, the depth window 126 may have a color/appearance of −2%<delta x<=2%, −2%<delta y<=3%, D65 (x)=0.3128, D65(y)=0.3290 (after an AR coating is applied).

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head mounted display (HMD) visor assembly comprising:
   a molded visor, the molded visor comprising:
      a first region, the first region comprising an infrared (IR) opaque and visible light permissive region; and
      a second region, the second region comprising an IR opaque and visible light opaque region, the second region being arranged at a top of the molded visor adjacent to, and above the first region;
   a separately manufactured IR window coupled to the second region of the molded visor, the separately manufactured IR window being IR permissive; and
   a separately molded second visor element coupled to the molded visor such that the molded visor forms a world-facing portion of the HMD visor assembly and the separately molded second visor element forms a user-facing portion of the HMD visor assembly, the second visor element comprising:
      a third region, the third region comprising an IR permissive but visible light opaque region, the third region being arranged at a top of the second visor element; and
      a fourth region, the fourth region comprising a visible light permissive region adjacent the third region.

2. The head mounted display visor assembly of claim 1, wherein the visor is coupled to the second visor element via an ultraviolet (UV) cured clear adhesive.

3. The head mounted display visor assembly of claim 1, wherein the first region of the visor is comprised of an IR absorption dye.

4. The head mounted display visor assembly of claim 1, wherein the second region at a top of the visor comprises an evaporative coating.

5. The head mounted display visor assembly of claim 1, wherein the third region at a top of the second visor element comprises a visual visible light opaque paint.

6. The head mounted display visor assembly of claim 1, the fourth region of the second visor element is configured to operate as at least part of an optical system for focusing one or more holograms displayed by a head mounted display at a predefined distance from the head mounted display visor assembly.

7. The head mounted display visor assembly of claim 1, wherein a linear gradient separates the second region at the top of the visor from the first region of the visor, such that the linear gradient forms a gradient between the first region of the visor and second region at the top of the visor.

8. A method for manufacturing a head mounted display (HMD) visor assembly, the method comprising:
obtaining a molded visor composed of a polycarbonate resin and an infrared (IR) absorption dye, wherein the molded visor includes a window frame for receiving a separately manufactured IR window;
applying a visible light opaque evaporative coating to a top portion of the molded visor to form a second region of the HMD visor assembly, the second region comprising an IR opaque and visible light opaque region, the second region being separate from a first region of the HMD visor assembly, the first region comprising an IR opaque and visible light permissive region of the molded visor;
obtaining a separately molded second visor element composed of a polycarbonate resin which transmits both IR and visible light;
applying a visible light opaque but IR permissive coating to a top portion of the separately molded second visor element to form a third region of the HMD visor assembly, the third region comprising an IR permissive but visible light opaque region, the third region being separate from a fourth region of the HMD visor assembly, the fourth region comprising a visible light permissive region of the separately molded second visor element; and
connecting the molded visor to the separately molded second visor element such that the molded visor forms a world-facing portion of the HMD visor assembly and the separately molded second visor assembly forms a user-facing portion of the HMD visor assembly.

9. The method of claim 8, further comprising:
applying a linear gradient evaporative coating to the molded visor that serves as a gradient between the first region and the second region.

10. The method of claim 8, further comprising:
applying an antireflective coating to the molded visor and the separately molded second visor element.

11. The method of claim 8, wherein the molded visor and the separately molded second visor element include overlapping extensions for aligning the molded visor with the separately molded second visor element.

12. The method of claim 11, wherein a blocking wall separates an overlapping extension of the separately molded second visor element from the fourth region and the third region of the separately molded second visor element, wherein the blocking wall is situated to prevent an adhesive from overflowing onto the fourth region and the third region.

13. The method of claim 12, wherein connecting the molded visor to the separately molded second visor element comprises:
bonding the molded visor to the separately molded second visor element by applying an adhesive to the overlapping extensions of the molded visor and the separately molded second visor element.

14. The method of claim 13, further comprising:
removing a portion of the overlapping extensions of the molded visor and the separately molded second visor element.

15. The method of claim 8, further comprising:
affixing the separately manufactured IR window to the window frame of the molded visor, wherein the separately manufactured IR window blocks visible light but transmits IR light.

16. A method for using a head mounted display (HMD) visor assembly, the method comprising:
obtaining a head mounted display including a head mounted display visor assembly, the head mounted display visor assembly comprising:
a molded visor, the molded visor comprising:
a first region, the first region comprising an IR opaque and visible light permissive region; and
a second region, the second region comprising an IR opaque and visible light opaque region at a top of the molded visor adjacent to, and above the first region;
a separately manufactured IR window coupled to the second region of the molded visor, the separately manufactured IR window being IR permissive; and
a separately molded second visor element coupled to the molded visor such that the molded visor forms a world-facing portion of the HMD visor assembly and the separately molded second visor element forms a user-facing portion of the HMD visor assembly, the separately molded second visor element comprising:
a third region, the third region comprising an IR permissive but visible light opaque region at a top of the separately molded second visor element; and
a fourth region, the fourth region comprising visible light permissive region adjacent to the third region; and
displaying one or more holograms on a display of the head mounted display situated between the molded visor and the separately molded second visor element of the head mounted display visor assembly, such that display light from the display transmits through the fourth region of the separately molded second visor element to an eye of a user, and wherein the separately molded second visor element operates as at least part of an optical system of the head mounted display for focusing the one or more holograms at a predefined distance from the head mounted display visor assembly.

17. The method of claim 16, further comprising:
transmitting visible environmental light from a real-world environment of the user through the first region, the display, and the fourth region to the eye of the user.

18. The method of claim 16, further comprising:
transmitting eye tracking IR light through the third region of the separately molded second visor element to the eye of the user.

19. The method of claim 16, further comprising:
transmitting IR environmental light reflections from a real-world environment of the user through the separately manufactured IR window while absorbing the IR environmental light reflections at the first region and the second region of the molded visor.

20. The method of claim 16, further comprising:
absorbing visible environmental light from a real-world environment of the user at the second region of the molded visor and the third region of the separately molded second visor element.

* * * * *